US008417783B1

(12) United States Patent
Sharma et al.

(10) Patent No.: US 8,417,783 B1
(45) Date of Patent: Apr. 9, 2013

(54) SYSTEM AND METHOD FOR IMPROVING FEATURE SELECTION FOR A SPAM FILTERING MODEL

(75) Inventors: Vipul Sharma, Sunnyvale, CA (US); John Gardiner Myers, Santa Clara, CA (US); Steve Lewis, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 1323 days.

(21) Appl. No.: 11/444,731

(22) Filed: May 31, 2006

(51) Int. Cl.
*G06F 15/16* (2006.01)
*G06F 17/00* (2006.01)

(52) U.S. Cl. ........................ 709/206; 709/224

(58) Field of Classification Search .......... 709/204–207
See application file for complete search history.

(56) References Cited

U.S. PATENT DOCUMENTS

| | | | | |
|---|---|---|---|---|
| 5,659,717 | A * | 8/1997 | Tse et al. ........................ | 716/7 |
| 6,192,360 | B1 * | 2/2001 | Dumais et al. .................. | 707/6 |
| 6,654,787 | B1 * | 11/2003 | Aronson et al. .............. | 709/206 |
| 7,685,271 | B1 * | 3/2010 | Schneider et al. ............ | 709/224 |
| 2004/0167964 | A1 * | 8/2004 | Rounthwaite et al. ........ | 709/206 |
| 2005/0049913 | A1 * | 3/2005 | Huddleston et al. ............ | 705/11 |
| 2006/0149821 | A1 * | 7/2006 | Rajan et al. .................... | 709/206 |

OTHER PUBLICATIONS

SpamAssassin SpamAssassin™. www.spamassassin.org.
N.N Dalvi, P. Domingos, Mausam, S. Sanghai, D. Verma.: Adversarial classification, KDD2004.
G. Rios and H. Zha.: Exploring SVM and Random Forest for Spam Detection, CEAS 2005.
V. Sharma, P. Sarda and S. Sharma.: An Add-on to Rule Based Sifters for Multi Recipient Spam Emails. NLDB 2005: 361-364.
I. Androutsopoulos, G. Paliouras, and E. Michelakis.: Learning to filter unsolicited commercial email Technical Report, National Centre for Scientific Research \Demokritos 2004.
P. Harremoeës and F. Topsøe.: Maximum Entropy Fundamentals, Entropy 2001, 3[3], 191-226.
Tom M. Mitchell.: Textbook-'Machine Learning' McGraw Hill Publications, ISBN 7-111-11502-3/TP. 2760.
Franck Veysset.: Honeypot Technologies, SAR Conference, 2005.
Proofpoint, Inc,. "Proofpoint MLX Whitepaper: Machine learning to beat spam today . . . and tomorrow" 15 pgs, 2005.
"MassesOverview", Tools in the SpamAssassin masses Folder, 7 pgs, Nov. 18, 2005, wiki.apache.org/spamassassin/MassesOverview.
"RulesProjSandboxes", 3 pgs, Nov. 12, 2005, wiki.apache.org/spamassassin/RulesProjSandboxes.
"MassesOverview", Tools in the SpamAssassin masses folder, 7 pgs, Nov. 18, 2005, wiki.apache.org/spamassassin/MassesOverview.

* cited by examiner

*Primary Examiner* — Ian N Moore
*Assistant Examiner* — Thai Nguyen
(74) *Attorney, Agent, or Firm* — Blakely, Sokoloff, Taylor & Zafman, LLP (57) ABSTRACT

A system and method for removing ineffective features from a spam feature set. In particular, in one embodiment of the invention, the an entropy value is calculated for the feature set based on the effectiveness of the feature set at differentiating between ham and spam. Features are then removed one at a time and the entropy is recalculated. Features which increase the overall entropy are removed and features which decrease the overall entropy are retained. In another embodiment of the invention, the value of certain type of time consuming features (e.g., rules) is determined based on both the information gain associated with the features and the time consumed implementing the features. Those features which have relatively low information gain and which consume a significant amount of time to implement are removed from the feature set.

23 Claims, 5 Drawing Sheets

SYSTEM AND METHOD FOR IMPROVING FEATURE SELECTION FOR A SPAM FILTERING MODEL

BACKGROUND

1. Field of the Invention

This invention relates to electronic message analysis and filtering. More particularly, the invention relates to a system and method for improving a spam filtering feature set.

2. Description of the Related Art

"Spam" is commonly defined as unsolicited bulk e-mail, i.e., email that was not requested (unsolicited) and sent to multiple recipients (bulk). Although spam has been in existence for quite some time, the amount of spam transmitted over the Internet and corporate local area networks (LANs) has increased significantly in recent years. In addition, the techniques used by "spammers" (those who generate spam) have become more advanced in order to circumvent existing spam filtering products.

Spam represents more than a nuisance to corporate America. Significant costs are associated with spam including, for example, lost productivity and the additional hardware, software, and personnel required to combat the problem. In addition, many users are bothered by spam because it interferes with the amount of time they spend reading legitimate e-mail. Moreover, because spammers send spam indiscriminately, pornographic messages may show up in e-mail inboxes of workplaces and children—the latter being a crime in some jurisdictions. Recently, there has been a noticeable increase in spam advertising websites which contain child pornography. "Phishing" emails are another type of spam that request account numbers, credit card numbers and other personal information from the recipient.

1. Real-Time Spam Filtering

Figure 1:
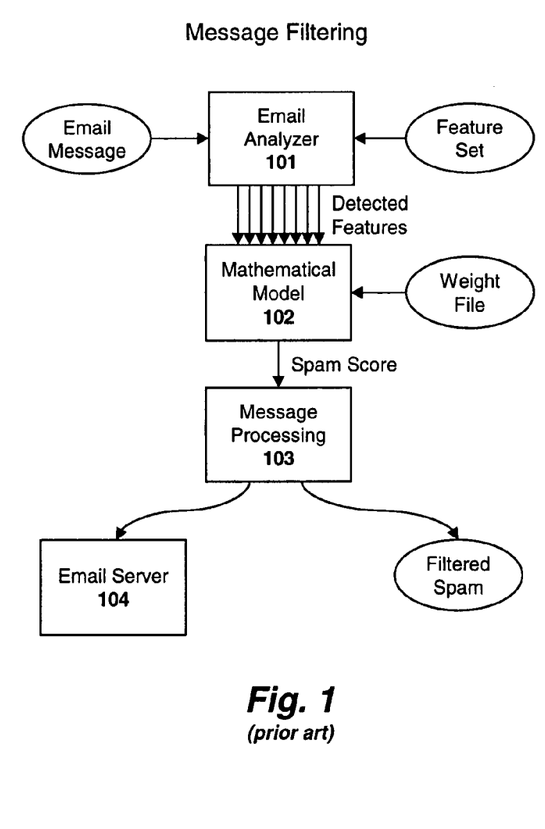
FIG. 1 illustrates an architecture of an exemplary prior art email filtering system.

Various techniques currently exist for filtering spam. Specifically, FIG. 1 illustrates an exemplary spam filtering architecture which includes an email analyzer module 101, a mathematical model module 102 and a message processing module 103.

The email analyzer module 101 analyzes each incoming email message to determine whether the email message contains one spam-like "features." Features used in content-based spam filters can be divided into three basic categories:

(1) Header information: Features that describe the information path followed by a message from its origin to its destinations as well as Meta information such as date, subject, Mail Transfer Agents (MTA), Mail User Agents (MUA), content types, etc.

(2) Message body contents: Features that describe the text contained in the body of an email, such as words, phrases, obfuscations, URLs, etc.

(3) Meta features: Boolean combinations of other features used to improve accuracy Once the features of an email message have been identified, a mathematical model 102 is used to apply "weights" to each of the features. Features which are known to be a relatively better indicator of spam are given a relatively higher weight than other features. The feature weights are determined via "training" of classification algorithms such as Naïve Bayes, Logistic Regression, Neural Networks, etc. Exemplary training techniques are described below with respect to FIG. 2.

The combined weights are then used to arrive at a spam "score." If the score is above a specified threshold value, then the email is classified as spam and filtered out by message processing module 103. By contrast, if the score is below the specified value, then the spam processing module forwards the email on to a user's account to the email server 104.

2. Training

As mentioned above, the weights applied to features within the feature set are determined through a process known as "training." Different algorithms use different methods of weight calculation including maximum entropy, error backtracking, etc. The spam model is regularly trained in order to assign weights to newly extracted features and update the weights associated with older features. Regular training helps to keep the weights of features updated according to the latest spam techniques in use.

Figure 2:
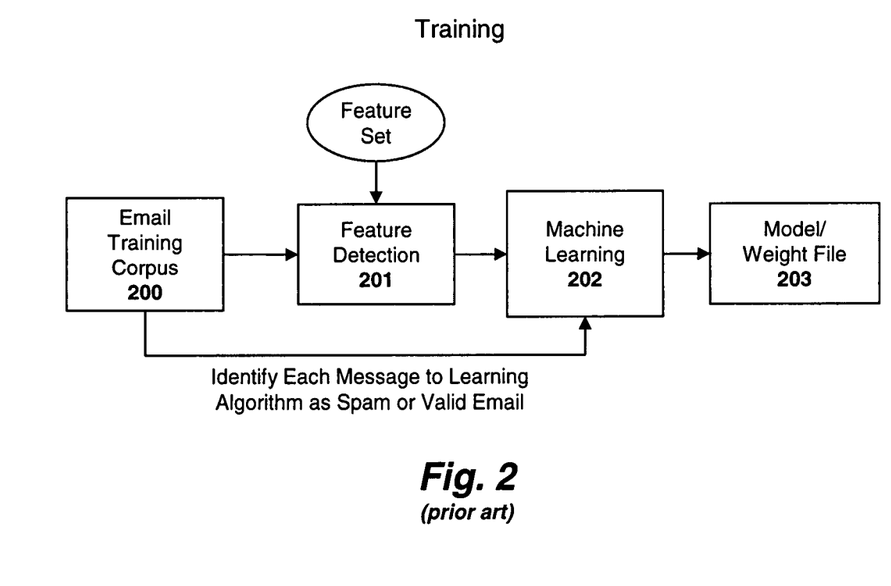
FIG. 2 illustrates an exemplary architecture for training using machine learning techniques.

FIG. 2 illustrates an exemplary training scenario which employs machine learning, a training technique developed by the assignee of the present patent application. See, e.g., Proofpoint MLX Whitepaper (2005), currently available at www.proofpoint.com. In this scenario, an email training corpus 200 containing known spam and ham messages is provided as a data source. A feature detection module 201 identifies features from the feature set within each email and provides this information to a machine learning module 202. The machine learning module 202 is also told whether each message is spam or ham. Using this information, the machine learning module 202 calculates a correlation between the features and spam messages, i.e., it determines how accurately certain features identify spam/ham. As mentioned above, various machine learning algorithms may be used such as Naïve Bayes, Logistic Regression, Neural Networks, etc.

The calculations performed by the machine learning module 202 are expressed in the form of a weight file 203 which associates a weight with each of the features in the feature set. For example, features which identify spam with relatively greater accuracy (e.g., "buy Viagra") are provided with relatively larger weights than other features (e.g., "visit online"). The weight file is subsequently used to perform spam filtering operations as described above.

3. Feature Selection

To efficiently handle the continuous introduction of new types of spam emails, it becomes vitally important to continually add new features or attributes to the model (the terms "attributes" and "features" are used interchangeably herein). One very important step to keep classifiers "healthy" and efficient is to keep track of these attributes and monitor their discriminative ability. It is essential to keep "good" (highly discriminative) attributes to ensure ongoing classification accuracy. But it is also important to discard "bad" (irrelevant or ineffective) attributes for at least the following reasons:

- Bad attributes increase the error in classification, bringing down overall effectiveness.
- As an increasingly large number of attributes are added the complexity of model complexity grows, resulting in increased classification times, memory usage and CPU utilization.
- There is a risk of over-fitting the model, caused by redundant or useless attributes as the model has to over train itself to produce high accuracy on the training data due to the presence of bad features. This overtraining results in a drop in accuracy in the test data and this effect is called over-fitting.

Being able to distinguish between good and bad features is essential for ensuring the long-term effectiveness of the model. The logic behind any feature extraction in spam filtering is that the feature should occur frequently in spam messages and infrequently in ham messages and vice versa. An ideal feature would "fire" only in spam or only in ham messages. As used herein, a feature "fires" when that feature is present in an email message.

Consequently, the methods used to evaluate the quality of extracted features are extremely important to ensure both high effectiveness in identifying spam and low false positive rate. One well known example is the open source spam filter SpamAssassin ("SA"), which calculates the effectiveness of a feature using the "S/O metric." S/O calculates feature quality by measuring the Hit Frequency, which is defined as the proportion of the spam messages in which a feature fired. For example, if a feature is present in 800 out of 1000 spam messages, then its S/O value is 0.8

Measuring the quality of features based on their S/O value biases the feature set towards "all spam" features. This method of feature selection works satisfactorily for individual spam filters where a 2-3% false positive rate is tolerable. However, enterprise-class spam filters have more stringent performance requirements. In enterprise spam solutions, designed to protect the messaging systems of large organizations with thousands of end users, even false positive rates over 0.1% result in a large amount of customer dissatisfaction.

It can be seen from the foregoing description that the effectiveness of enterprise-class spam e-mail filters relies on the quality of the feature set used by the filter's classification model. Highly effective filters may employ an extremely large number of such features (e.g., 350,000 features), which can consume a significant amount of storage space and classification time. Due to the "adversarial" nature of spam, the quality of individual features keeps changing as spam email campaigns evolve or as new campaigns emerge. Regularly discarding features which have become ineffective ("bad features") benefits the spam filter with reduced classification time (model training time and reduced email delivery time), reduced storage requirements, increased spam detection accuracy and less risk of over-fitting of the model.

Accordingly, improved techniques for selecting beneficial features and removing inefficient features are desirable.

SUMMARY

A system and method are described for removing ineffective features from a spam feature set. In particular, in one embodiment of the invention, the an entropy value is calculated for the feature set based on the effectiveness of the feature set at differentiating between ham and spam. Features are then removed one at a time and the entropy is recalculated. Features which increase the overall entropy are removed and features which decrease the overall entropy are retained.

In another embodiment of the invention, the value of certain type of time consuming features (e.g., rules) is determined based on both the information gain associated with the features and the time consumed implementing the features. Those features which have relatively low information gain and which consume a significant amount of time to implement are removed from the feature set.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention selects features that are indicative of ham, in addition to spam, to lower the false positive rate. These features are associated with negative weights and balance the message score Si against redundant spam features that fire in ham messages. For example, one embodiment of the invention includes a feature referred to herein as 'X_NO_RULES_FIRED' which fires if a particular email message does cause any spam features to fire.

Table A illustrates the inadequacy of the S/O metric in evaluating these types of "hammy" features. In this example, 'visit online' has a higher S/O value than 'X_NO_RULES_FIRED' irrespective of the fact that 'visit online' fires equally in both spam and ham messages and hence has no discrimination ability. The 'X_NO_RULES_FIRED' feature is a good ham feature which will decrease the false positive rate whereas 'visit online' is a non-discriminative feature which will increase the false positive rate.

TABLE A

| FEATURE | SPAM | HAM | S/O |
| --- | --- | --- | --- |
| Viagra | 92.1% | 7.9% | 0.921 |
| Buy Viagra | 99.8% | 0.2% | 0.998 |
| MSGID_RANDY | 82% | 18% | 0.82 |
| Vi@gr@@5 | 100% | 0% | 1.0 |
| visit online | 50% | 50% | 0.5 |
| X_NO_RULES_FIRED | 20% | 80% | 0.2 |

To address the inadequacy of prior feature selection techniques, one embodiment of the invention uses "Information Gain" (IG) techniques for feature selection in a pre-processing stage before training. Specifically, IG is used to determine the quality of a feature based on the number of times the feature fires in a particular class of message. The aim is to maintain features that fire frequently in one class (spam/ham) of message and therefore have high information gain.

Figure 3:
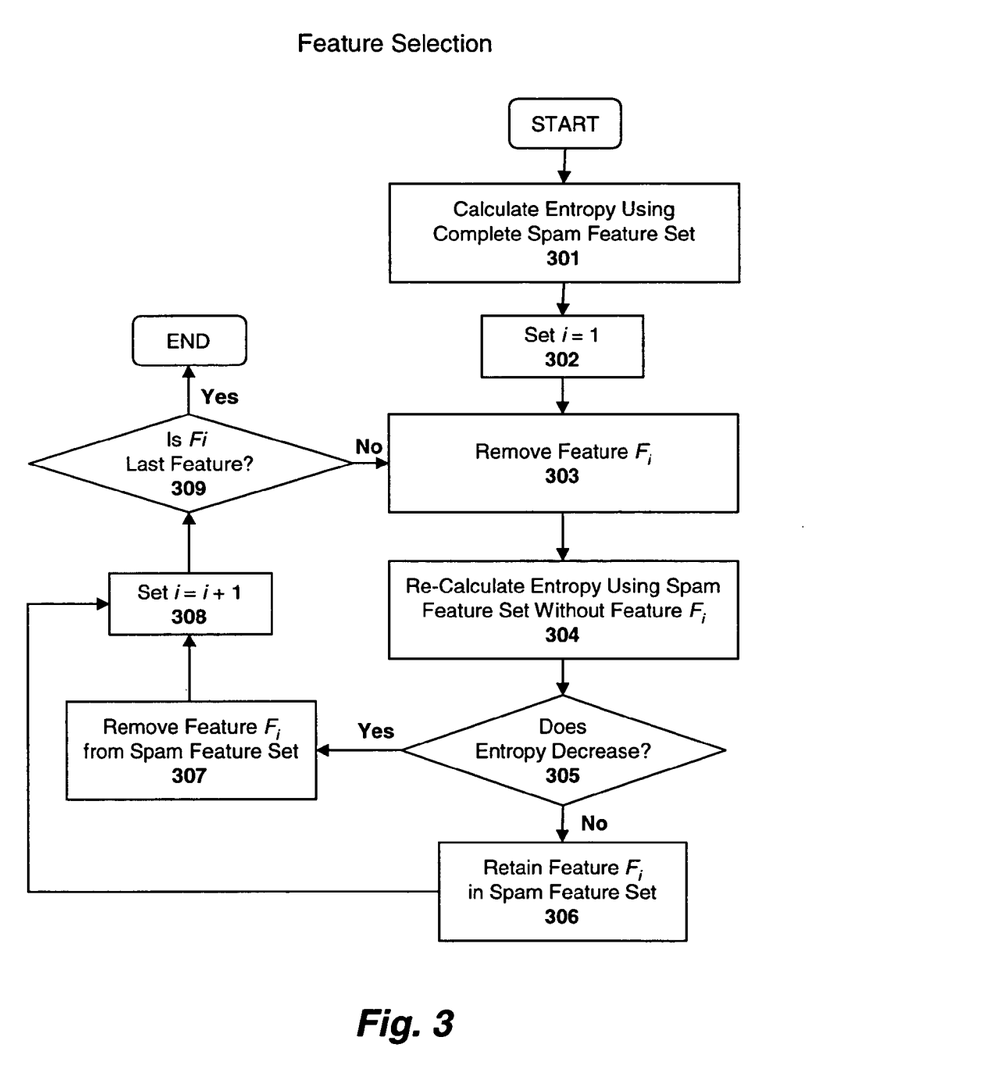
FIG. 3 illustrates one embodiment of a method for removing inefficient features form a feature set.

FIG. 3 provides a high level overview of this embodiment of the invention in which the importance of a feature is measured as an expected reduction in entropy of the model due to an attribute. Entropy represents a level of randomness. Thus, if the randomness of the model decreases when a feature is removed, then that feature does not effectively differentiate between ham/spam, and should be removed from the feature set. A more detailed mathematical analysis is provided following the description of the process in FIG. 3.

Turning now to the process, at 301, the entropy of the current feature set is calculated using known techniques (see, e.g., the entropy equations below). At 302, variable i is set to 1 and, at 303, a first feature $F_i$ is removed from the feature set. At 304, the entropy of the model is recalculated without the first feature. If the entropy decreases, determined at 305, then the feature $F_i$ is permanently removed from the spam feature set at 307. If, however, the entropy increases, then $F_i$ is retained in the feature set at 306. To determine whether the entropy increases or decreases, the entropy of the full feature set may be subtracted from the entropy of the feature set without feature $F_i$. As mentioned above, the reason for removing a feature which increases entropy of the model is that the entropy value represents a level of randomness. If entropy increases, then the model becomes more random, meaning that it is less effective at differentiating between ham and spam. At 308, the variable i is increased by 1 and, unless $F_i$ is the last feature, determined at 309, the process repeats from 303 with the new feature.

Having described the underlying principles of one embodiment of the invention with respect to FIG. 3, additional details associated with the feature selection process will now be presented. As mentioned above, information gain measures the importance of a feature as an expected reduction in entropy of the model due to an attribute. Generally, for a training set S that consists of positive and negative examples of some target concept, the information gain of an attribute A that can take values from value(A) is given by $$IG(S,A) = \text{Entropy}(S) - \Sigma_{v \in value(A)}(|S_v|/|S|)\text{Entropy}(S_v)$$

$S_v$ is the subset of S for which attribute A has value v (i.e., $S_v = \{s \in S | A(s) = v\}$). For a given training set S, the Entropy is defined as $$\text{Entropy}(S) = \Sigma_{i \in Class} -p_i \log_2 p_i$$

Within the context of a spam filtering feature set, IG is used to judge the quality of a feature based on the number of times the feature fires in a particular class of message. The aim is to maintain features that fire frequently in one class (spam/ham) of message and hence should have high information gain. Consequently, the features that either fire less frequently or fire in both spam and ham will have low IG. This section explains the way IG is calculated for the spam model.

Let $N_T$ be the total number of messages, $N_H$ be the ham messages and $N_S$ be the spam messages in the training corpora. Let a feature be represented as $F_i$. Let $N_{Hi}$ be the number of ham messages in which feature $F_i$ fires and let $N_{Si}$ be the number of spam messages in which feature $F_i$ fires. $N_{Ti}$ represents the total messages in which $F_i$ fires and is given by $$N_{Ti} = N_{Si} + N_{Hi}$$

Similarly $N'_{Hi}$ and $N'_{Si}$ are the ham and spam messages in which feature $F_i$ did not fire. $N'_{Ti}$ is the total messages in which $F_i$ did not fire and is given by $$N'_{Ti} = N'_{Si} + N'_{Hi}$$

Let H(S) be the total entropy of the training corpora and is given by $$H(S) = -(N_S/N_T)\log_2(N_S/N_T) - (N_H/N_T)\log_2(N_H/N_T)$$

$H(F_i)$ is the entropy of messages in which feature $F_i$ fired and $H'(F_i)$ is the entropy of messages in which feature did not fire. These are formulated as $$H(F_i) = -(N_{Hi}/N_{Ti})\log_2(N_{Hi}/N_{Ti}) - (N_{Si}/N_{Ti})\log_2(N_{Si}/N_{Ti})$$

$$H'(F_i) = -(N'_{Hi}/N'_{Ti})\log_2(N'_{Hi}/N'_{Ti}) - N'_{Si}/N'_{Ti} \log_2(N'_{Si}/N'_{Ti})$$

$IG(F_i)$ is the information Gain of feature $F_i$ and is calculated as $$IG(F_i) = H(S) - (N_{Ti}/N_T)H(F_i) - (N'_{Ti}/N_T)H'(F_i)$$

The value of IG for a feature varies between 0 and 1. In one embodiment of the invention, if the IG of a feature is less than a predefined threshold, the feature is considered to be useless and is discarded from the feature set. The threshold is usually based on the overall accuracy of the model.

In addition to the foregoing feature selection process, one embodiment of the invention evaluates the timing cost for certain types of time-consuming features such as "rules" to determine if the feature should be removed from the model. "Rules" are meta-features that exploit similarities in the spam messages for classification. These meta-features fire when some predefined condition is satisfied in a message (e.g., Buy Rolex OR Online Store OR Cheap OR Click Here). This meta-feature is a combination of four features: Rolex, Online Store, Cheap and Click Here. These features independently are not a good representation of spam but their combination in a rule makes them a useful feature. Another example of a rule is X_NO_RULES_FIRED, described above.

Rules are the most time consuming features used in the spam classification process. In one embodiment of the invention, rules that take an inordinately long amount of time and have relatively low discrimination capability are discarded, resulting in a logical tradeoff between timing cost and IG for a faster and safer spam processing system.

In one embodiment, timing cost of a feature is measured by sampling the system clock before and after each feature is evaluated, and then calculating the difference in time. For each feature the sum of times across all messages in the training corpora is collected.

Figure 4:
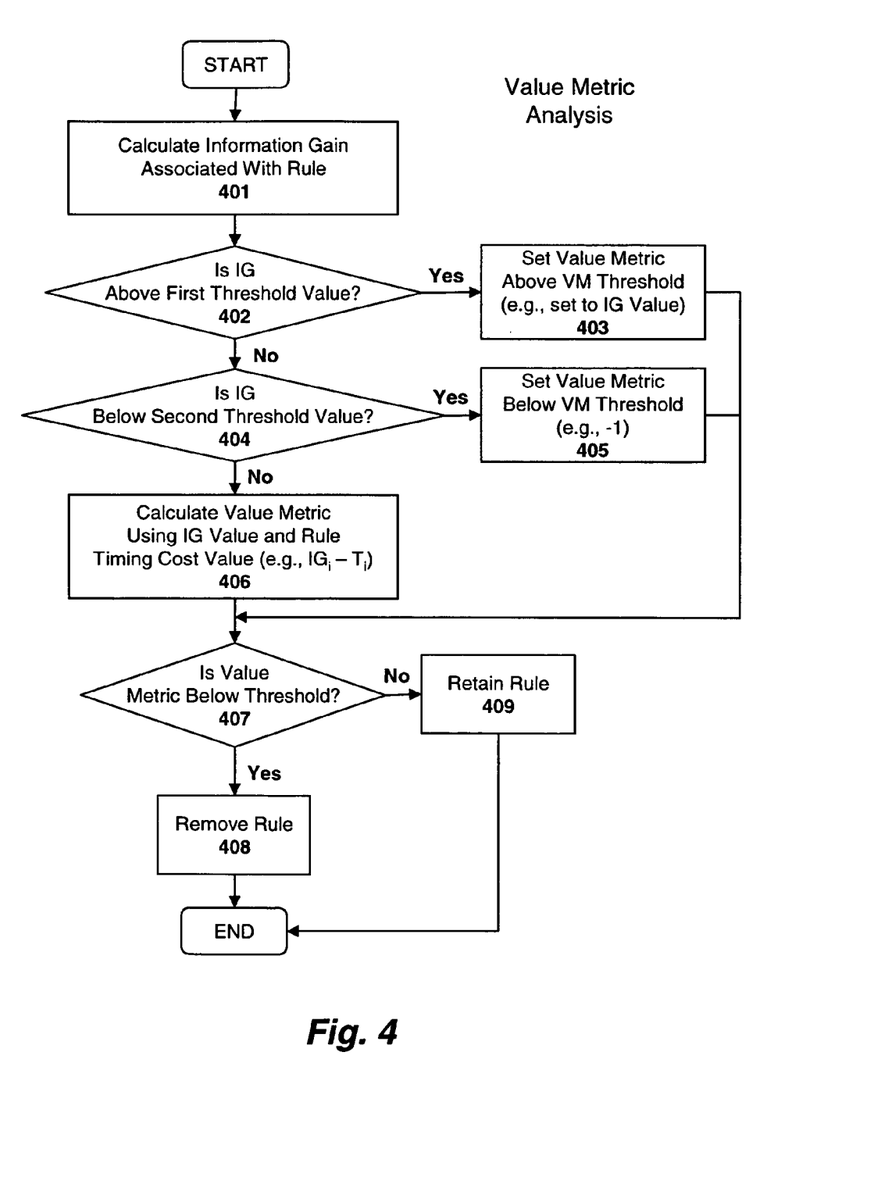
FIG. 4 illustrates one embodiment of a method for evaluating features based on information gain and feature timing.

FIG. 4 illustrates one embodiment of a process for factoring in timing cost using a "rule value metric"—a value representing the tradeoff between the timing cost of rules (and/or other time-consuming features) and their information gain. At 401, the IG associated with the rule is calculated using, for example, the IG techniques described above. If the IG is above a specified threshold value, determined at 402, then, at 403, the rule value metric is set above a value metric threshold (in effect, retaining the rule regardless of its timing cost). In one embodiment of the invention, this means setting the value metric equal to the IG value.

If the IG is below a specified threshold value, determined at 404, then, at 405, the rule value metric is set below the value metric threshold value (in effect, removing the rule regardless of its timing cost). In one embodiment of the invention, this means setting the value metric equal to −1.

If the IG of the rule is between the first threshold IG threshold and the second IG threshold values, then at 406, the value metric is calculated based on the IG value and a timing cost value associated with the rule (which indicates the time consumed to implement the rule). In one embodiment of the invention, the value metric is calculated by subtracting a normalized timing cost value with a normalized IG value.

If the value metric is below the value metric threshold, determined at 407, then the rule is removed from the model at 408. If, however, the value metric is above the value metric threshold, then the rule is retained in the model at 409.

Additional mathematical details associated with one embodiment of the invention will now be provided. We assume a set of rule R as a subset of feature space. Let $R_i$ any rule that belongs to R. Let IG be the set of information gain of the corresponding elements in R and similarly T be the set of the timing cost of the corresponding rules. Let $IG_i$ be the value of information gain and $T_i$ be the value of the timing cost for any rule $R_i$. The value metric of any rule $R_i$ is represented as $V_i$.

The functions max(S) and min(S) return the maximum and minimum element of a set of real numbers S, respectively. Using these functions, the maximum and minimum elements of set IG and T may be found.

$$\max IG = \max(IG)$$

$$\min IG = \min(IG)$$

$$\max T = \max(T)$$

$$\min T = \min(T)$$

Let $nIG_i$ and $nT_i$ be the normalized value of the $i_{th}$ element of IG and T. This is calculated as:

$$nIG_i = (IG_i - \min IG)/(\max IG - \min IG)$$

$$nT_i = (T_i - \min T)/(\max T - \min t)$$

The value metric $V_i$ is then calculated as:

$$V_i = \begin{cases} IG_i & \text{if } IG_i > 0.002 \\ nIG_i - nT_i & \text{if } 0.002 < IG_i < 1.0e-09 \\ -1 & \text{if } IG_i < 1.0e-09 \end{cases}$$

Figure 5:
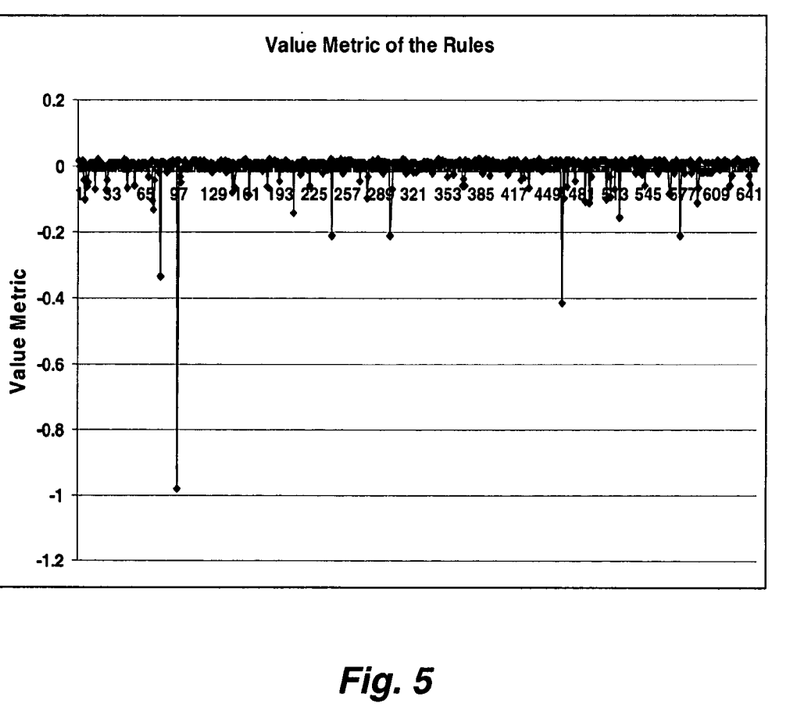
FIG. 5 illustrates an exemplary value metric graph.

A line chart of the value metrics of rules used in one exemplary test are illustrated in FIG. 5. The features that form the negative spikes below the value metric threshold in FIG. 5 are removed. In one embodiment of the invention, the threshold of the value metric is set to -0.005 for accuracy reasons.

While the embodiments described above focus on evaluating "rules" based on a calculated value metric, it should be noted that the underlying principles of the invention are not limited to "rules." In fact, the underlying principles of the invention may be used to evaluate any type of time-consuming spam features within a feature set.

Embodiments of the invention may include various steps as set forth above. The steps may be embodied in machine-executable instructions which cause a general-purpose or special-purpose computer processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although some embodiments described above use changes in entropy to determine whether a feature should be removed from a feature set, the underlying principles of the invention may be implemented in the context of virtually any technique for evaluating the randomness of a model. Moreover, the underlying principles of the invention may be implemented within virtually any time of computing platform including standard personal computer configurations and server configurations.

Accordingly, the scope and spirit of the invention should be judged in terms of the claims which follow.

What is claimed is:

1. A computer-implemented method for selecting spam features within a spam feature set comprising:
processing program code in a processor to perform the operations of:
providing a spam feature set comprised of a first subset of features configured to trigger upon receipt of spam email messages and a second subset of features configured to trigger upon receipt of valid email messages ("ham"), wherein the first subset of features comprise functions to identify spam email messages, and the second subset of features comprise functions to identify valid email messages;
determining a first entropy value associated with the spam feature set, the first entropy value indicating how effectively the spam feature set differentiates between spam and ham;
removing a feature from the spam feature set, the feature selected from either the first subset or the second subset;
determining a second entropy value associated with the spam feature set without the feature, the second entropy value indicating how effectively the spam feature set differentiates between spam and ham after the feature has been removed; and
if the second entropy value is less than the first entropy value, then discarding the feature from the spam feature set, and
if the second entropy value is greater than the first entropy value, then retaining the feature in the spam feature set.

2. The method as in claim 1 further comprising:
selectively removing and/or retaining the feature if the first entropy value is equal to the second entropy value.

3. The method as in claim 1 further comprising:
subtracting the second entropy value from the first entropy value to determine whether the second entropy value is less than the second entropy value.

4. The method as in claim 1 further comprising:
successively removing additional features from the feature set one by one and determining additional entropy values associated with the spam feature set after each feature is removed; and
if the entropy value decreases after each feature is removed, then discarding the feature from the spam feature set, and
if the entropy value increases after each feature is removed, then retaining the feature in the spam feature set.

5. The method as in claim 4 further comprising:
arriving at a final spam feature set after an effect of each feature on entropy has been tested; and
performing one or more training operations by applying a series of known spam and ham messages to the feature set.

6. The method as in claim 5 wherein the training operations comprise machine learning operations.

7. The method as in claim 6 further comprising:
generating a weight file indicating a relative weight of each of the features in the final spam feature set.

8. The method as in claim 7 further comprising:
analyzing an incoming email message to identify features within the feature set found in the email message;
applying the weights from the weight file to the identified features;

generating a spam score based on the combined weights; and determining that the email message is spam or ham based on the combined weights.

9. The method as in claim 8 further comprising:

adding the weights from the weight file to generate the spam score.

10. A computer-implemented method for selecting spam features within a spam feature set comprising:

measuring information gain ("IG") associated with each of a plurality of features within a spam filtering feature set, wherein IG is calculated for the plurality of features and a training set as the entropy of the training set minus a weighted sum of entropies of a subset of the training set, wherein the subset is selected based on the plurality of features;

determining a timing cost value associated with the each of the features within the spam filtering feature set, the timing cost value indicating an amount of time associated with execution of a feature within the spam filtering feature set; and determining whether to remove each of the features from the spam filtering feature set based on both the IG and the timing cost value associated with each of the features of the spam feature set.

11. The method as in claim 10 wherein determining whether to remove each of the features further comprises:

calculating a normalized IG value for the feature;

calculating a normalized timing cost value for the feature;

subtracting the normalized timing cost value from the normalized IG value to arrive at a value metric value; and if the value metric value is below a specified threshold, then removing the feature associated with the value metric.

12. The method as in claim 10 further comprising:

retaining features within the feature set having IG above a first specified threshold value regardless of the timing cost value.

13. The method as in claim 10 further comprising:

determining whether to remove each of the features from the spam filtering feature based on a timing cost value only for certain specified types of features within the spam feature set which are known to consume a relatively large amount of time during spam filtering.

14. The method as in claim 13 wherein the specified types of features are rules.

15. A non-transitory machine-readable medium having program code stored thereon which, when executed by a machine, causes the machine to perform the operations of:

providing a spam feature set comprised of a first subset of features configured to trigger upon receipt of spam email messages and a second subset of features configured to trigger upon receipt of valid email messages ("ham"), wherein the first subset of features comprise functions to identify spam email messages, and the second subset of features comprise functions to identify valid email messages;

determining a first entropy value associated with the spam feature set, the first entropy value indicating how effectively the spam feature set differentiates between spam and ham;

removing a feature from the spam feature set, the feature selected from either the first subset or the second subset;

determining a second entropy value associated with the spam feature set without the feature, the second entropy value indicating how effectively the spam feature set differentiates between spam and ham after the feature has been removed; and if the second entropy value is less than the first entropy value, then discarding the feature from the spam feature set, and if the second entropy value is greater than the first entropy value, then retaining the feature in the spam feature set.

16. The non-transitory machine-readable medium as in claim 15 further comprising program code which causes the machine to perform the additional operations of:

selectively removing and/or retaining the feature if the first entropy value is equal to the second entropy value.

17. The non-transitory machine-readable medium as in claim 15 further comprising program code which causes the machine to perform the additional operations of:

subtracting the second entropy value from the first entropy value to determine whether the second entropy value is less than the second entropy value.

18. The non-transitory machine-readable medium as in claim 15 further comprising program code which causes the machine to perform the additional operations of:

successively removing additional features from the feature set one by one and determining additional entropy values associated with the spam feature set after each feature is removed; and if the entropy value decreases after each feature is removed, then discarding the feature from the spam feature set, and if the entropy value increases after each feature is removed, then retaining the feature in the spam feature set.

19. The non-transitory machine-readable medium as in claim 18 further comprising program code which causes the machine to perform the additional operations of:

arriving at a final spam feature set after the effect of each feature on entropy has been tested; and performing one or more training operations by applying a series of known spam and ham messages to the feature set.

20. The non-transitory machine-readable medium as in claim 19 wherein the training operations comprise machine learning operations.

21. The non-transitory machine-readable medium as in claim 20 further comprising program code which causes the machine to perform the additional operations of:

generating a weight file indicating a relative weight of each of the features in the final spam feature set.

22. The non-transitory machine-readable medium as in claim 21 further comprising program code which causes the machine to perform the additional operations of:

analyzing an incoming email message to identify features within the feature set found in the email message;

applying the weights from the weight file to the identified features;

generating a spam score based on the combined weights; and determining that the email message is spam or ham based on the combined weights.

23. The non-transitory machine-readable medium as in claim 22 further comprising:

adding the weights from the weight file to generate the spam score.

* * * * *